United States Patent
Lim et al.

[11] Patent Number: 6,108,484
[45] Date of Patent: Aug. 22, 2000

[54] SELF-DIAGNOSING APPARATUS AND METHOD FOR VIDEO RECORDING AND REPRODUCING APPARATUS

[75] Inventors: Yong-Taik Lim, Seoul; Weon-Seok Cho; Tae-Chorl Shin, both of Kyoungki-Do, all of Rep. of Korea

[73] Assignee: LG Electronics Inc., Seoul, Rep. of Korea

[21] Appl. No.: 08/866,092

[22] Filed: May 30, 1997

[51] Int. Cl.⁷ .................................................. H04N 5/76
[52] U.S. Cl. .............................................. 386/46; 360/331
[58] Field of Search ........................... 386/1, 46; 360/31; 73/862.51, 865.9, 432.1, 1.01; H04N 5/76, 5/92

[56] References Cited

U.S. PATENT DOCUMENTS

| | | | |
|---|---|---|---|
| 5,331,616 | 7/1994 | Morita et al. | 360/31 |
| 5,485,320 | 1/1996 | Vogel et al. | 360/31 |
| 5,598,301 | 1/1997 | Suzuki et al. | 360/31 |
| 5,625,503 | 4/1997 | Sasajima | 360/31 |
| 5,654,841 | 8/1997 | Hobson et al. | 360/31 |
| 5,657,176 | 8/1997 | Moribe et al. | 360/31 |
| 5,719,716 | 2/1998 | Suzuki | 360/31 |
| 5,731,921 | 3/1998 | Hughes et al. | 360/31 |

*Primary Examiner*—Thai Tran

[57] ABSTRACT

A self-diagnosing apparatus and a method for a video recording and reproducing apparatus which are capable of detecting errors of the apparatus, and classifying the errors for thus more effectively correcting the errors. The apparatus includes an operation state detection unit for detecting an operation state of a part of the apparatus, a self-diagnosing unit for checking an erroneous part based on an output signal from the operation state detection unit and checking a using state of a telephone for displaying an information which is used for correcting the error and externally transmitting the information, a memory apparatus for storing an information therein used for an error correction, and a modem for externally transmitting an information from the self-diagnosing unit via a public telephone line.

8 Claims, 13 Drawing Sheets

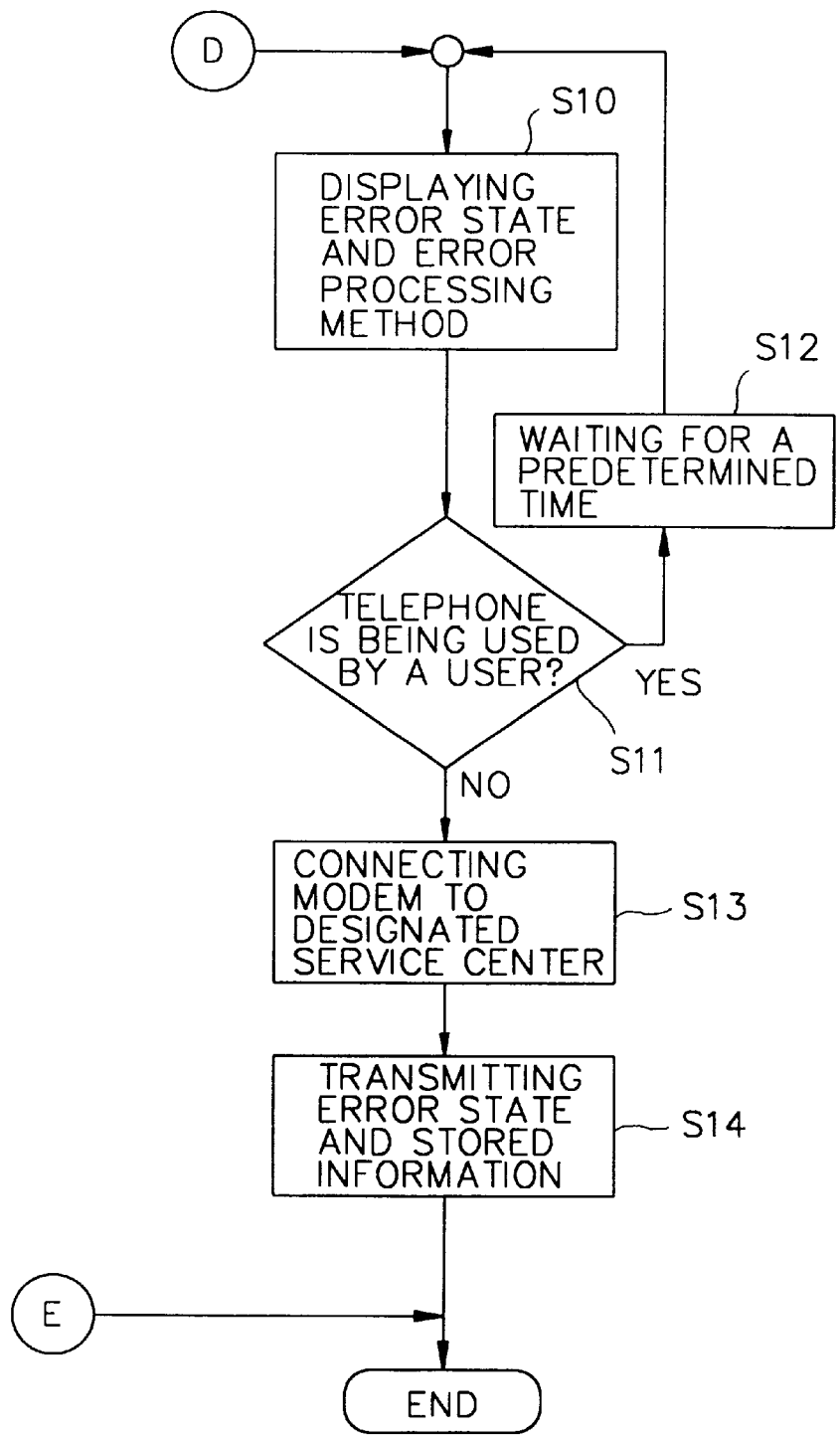

FIG.9

| RECEIVING TERMINAL | OK |
|---|---|
| FEC DECODER | OK |
| DEMULTIPLEXOR | OK |
| AUDIO/VIDEO DECODER | NG |

SELF-DIAGNOSING APPARATUS AND METHOD FOR VIDEO RECORDING AND REPRODUCING APPARATUS

BACKGROUND OF THE INVENTION

1. Field of the Invention

The present invention relates to a self-diagnosing apparatus and a method for a video recording and reproducing apparatus, and in particular to an improved self-diagnosing apparatus and a method for a video recording and reproducing apparatus which are capable of detecting the errors of parts of the apparatus, and classifying the errors for thus more effectively correcting the errors.

2. Description of the Conventional Art

FIG. 1 illustrates a conventional self-diagnosing content display apparatus for a video cassette tape recorder (VCR).

As shown therein, the conventional self-diagnosing content display apparatus for a VCR includes a microcomputer 1 for controlling the entire operation of an apparatus and controlling a self-diagnosing content display operation, a dew formation detection unit 2 for detecting a dew formation on a head drum and inputting a data corresponding to the dew formation detection into the microcomputer 1, a servo unit 3 for generating hardware signals of 30 Hz and 25 Hz in accordance with an NTSC and PAL method and inputting the signals into the microcomputer 1, a deck unit 5 for converting the operation mode in accordance with a control of the microcomputer 1, a motor driving unit 4 for controlling the operation of the deck unit 5, a reel pulse signal detection unit 6 for detecting a reel pulse signal produced during a video tape running operation by the deck unit 5 and inputting the signal into the microcomputer 1, a synchronous signal detection unit 7 for detecting a synchronous signal from the inputted video signal, and a display unit 8 for generating a character signal corresponding to the error and mixing the signal with a video signal in accordance with the control of the microcomputer 1.

The deck unit 5 includes a mode conversion motor 5-1 driven in accordance with a control of the motor driving unit 4 for converting the operation mode, and a mode switch unit 5-2 for detecting the converted operation mode and inputting the detected mode into the microcomputer 1.

The operation of a conventional self-diagnosing content display apparatus for a VCR will now be explained with reference to the accompanying drawings.

First, the dew formation detection unit 2 detects a dew formation on the head drum, and inputs the detected result into the microcomputer 1, and the servo unit 3 generates hardware signals of 30 Hz and 25 Hz in accordance with an NTSC and PAL method when reproducing the recorded tape by using the servo unit 3 and inputs the signals into the microcomputer 1.

Thereafter, the microcomputer 1 controls the mode conversion motor 5-1 of the deck unit 5 through the motor driving unit 4 for thus setting the operation mode of the deck unit 5. In addition, the mode switch unit 5-2 detects the set operation mode and inputs the detected mode into the microcomputer 1. The video tape is run by the deck unit 5, and the reel pulse signal detection unit 6 detects the reel pulse signals which are produced during the tape running operation and inputs the signals into the microcomputer 1.

Therefore, the microcomputer 1 judges whether there is an error in the apparatus by using the output signals from the dew formation unit 2, the servo unit 3, the mode switch unit 5-1, and the reel pulse signal detection unit 6. If there is an error, a character signal corresponding to the error is generated, and the display unit 8 judges whether a video signal is inputted in accordance with an output signal from the synchronous signal detection unit 7. If there exists a video signal, the character signal is mixed with the video signal. If there is not a video signal, the character signal is outputted in accordance with an internal synchronous signal for thus informing a user of the fact that the error occurred.

In addition, FIGS. 2A and 2B illustrate a conventional self-diagnosing content display method for a VCR.

As shown therein, the conventional self-diagnosing content display method for a VCR includes a first step for detecting whether dew is formed on the head drum when driving a video tape, a second step for displaying a character signal and error content that a dew is formed on the head drum as a result of the dew formation detection and stopping the display operation after a predetermined time, a third step for judging whether a hardware signal is inputted during a normal speed reproducing operation, a fast forward direction reproducing operation or a fast reverse direction reproducing operation when dew is not formed on the head drum as a result of the first step, a fourth step for displaying a character signal and error content when the hardware signal is not inputted and stopping the display operation after a predetermined time, a fifth step for judging whether a reel pulse signal is inputted after judging whether the video tape is driven in the fast winding mode, the rewinding mode, or the recording mode when the hardware signal is inputted during the normal speed reproducing operation, the fast forward direction reproducing operation or the fast reverse direction reproducing operation as a result of the judgement of the third step, a sixth step for displaying a character signal and error content by judging the operation of the apparatus as the motor is not driven when the reel pulse signal is not inputted as a result of the judgement and stopping the display operation after a predetermined time, a seventh step for judging whether a desired operation mode is set within the set time in accordance with the output signal from the mode switch unit during the mode conversion operation by judging whether the operation is currently performed in the mode conversion operation when the video tape operation is not in the fast winding mode, the rewinding mode, and the recording mode as a result of the fifth step, and an eighth step for displaying a character signal and error content when the desired operation mode is not set as a result of the judgement and stopping the display operation after a predetermined time.

In the conventional self-diagnosing content display method for a VCR, it is judged whether dew is formed on the head drum in accordance with the output signal from the dew formation detection unit. If dew is formed thereon, a character signal and error content such as "Dew is formed on the head drum" is displayed, and then the display operation is stopped after a predetermined time.

In the normal speed reproducing mode (PB), the fast forward direction reproducing (CUE) mode, or the fast reverse direction reproducing (REV) mode, it is judged whether a hardware signal is inputted thereinto from the servo unit 3, and then a character signal and error content such as "The head drum is not rotated" is displayed, and the display operation is stopped after a predetermined time.

In addition, if a hardware signal is inputted in the normal speed reproducing mode, the fast forward direction reproducing mode, or the fast reverse direction reproducing mode, or if the operation mode is performed in the fast forward winding mode (FF), the rewinding mode (REW), or the recording mode (REC), it is judged whether a reel pulse signal is inputted thereinto from the reel pulse signal detection unit 6. If the reel pulse signal is not inputted as a result of the judgement, it is judged that the capstan motor is not driven. Thereafter, a character signal and error content such as "The capstan motor is not rotated" is displayed, and the display operation is stopped after a predetermined time.

In addition, in the conversion mode, it is judged whether a desired operation mode is set within a set time in accordance with the output signal from the mode switch unit 5-2. If the operation mode is not set, it is judged that the mode conversion motor 5-1 is not driven. Thereafter, a character signal and error content such as "The operation mode is not set" is displayed, and the display operation is stopped after a predetermined time.

As described above, since the conventional self-diagnosing content display apparatus and a method for a VCR does not include an apparatus which is capable of self-diagnosing the operation of the apparatus, it is impossible to accurately diagnose the apparatus. In addition, if an error occurs in the apparatus, a user may erroneously operate the apparatus for thus causing a critical damage to the apparatus. In addition, due to the damages, the life span of the apparatus may be shortened.

SUMMARY OF THE INVENTION

Accordingly, it is an object of the present invention to provide a self-diagnosing apparatus and a method for a video recording and reproducing apparatus which overcome the aforementioned problem encountered in the conventional art.

It is another object of the present invention to provide an improved self-diagnosing apparatus and a method for a video recording and reproducing apparatus which are capable of detecting errors of the apparatus, and classifying the errors for thus more effectively correcting the errors.

To achieve the above objects, there is provided a self-diagnosing apparatus for a video recording and reproducing apparatus which includes an operation state detection unit for detecting an operation state of a part of the apparatus, a self-diagnosing unit for checking an erroneous part based on an output signal from the operation state detection unit and checking a using state of a telephone for displaying an information which is used for correcting the error and externally transmitting the information, a memory apparatus for storing an information therein used for an error correction, and a modem for externally transmitting an information from the self-diagnosing unit via a public telephone line.

To achieve the above objects, there is also provided a self-diagnosing method for a video recording and reproducing apparatus which includes the steps of a diagnosing step for diagnosing an operation state of a part of the apparatus based on an operation state detection signal of a part of the apparatus and a pre-stored use record of the part, a classification step for classifying the errors as an error which may be corrected by a user based on the result of the diagnosis in the diagnosing step and as an error which must be transmitted to the outside, a display step for displaying a diagnosis result detected in the diagnosing step and a prestored error correction method when the error is classified as an error which can be corrected, and a transmission step for transmitting an error to a receiver having a telephone number previously designated via a modem in accordance with a result of the diagnosis in the diagnosing step when the error is classified in the classification step as an error which must be transmitted to the outside.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a diagram illustrating a self-diagnosing table in the apparatus according to the present invention.

DETAILED DESCRIPTION OF THE INVENTION

Figure 1:
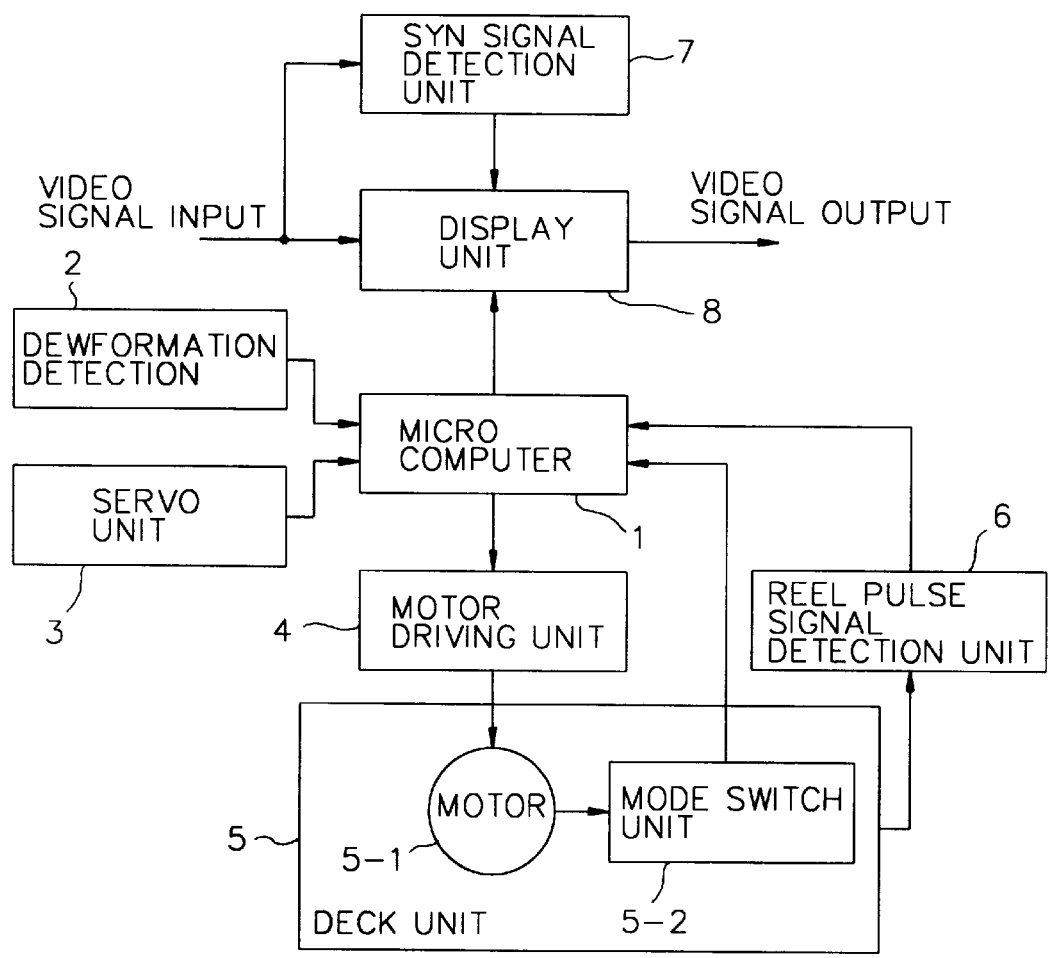
FIG. 1 is a block diagram illustrating a conventional self-diagnosing content display apparatus for a video cassette tape recorder (VCR)
Figure 2:
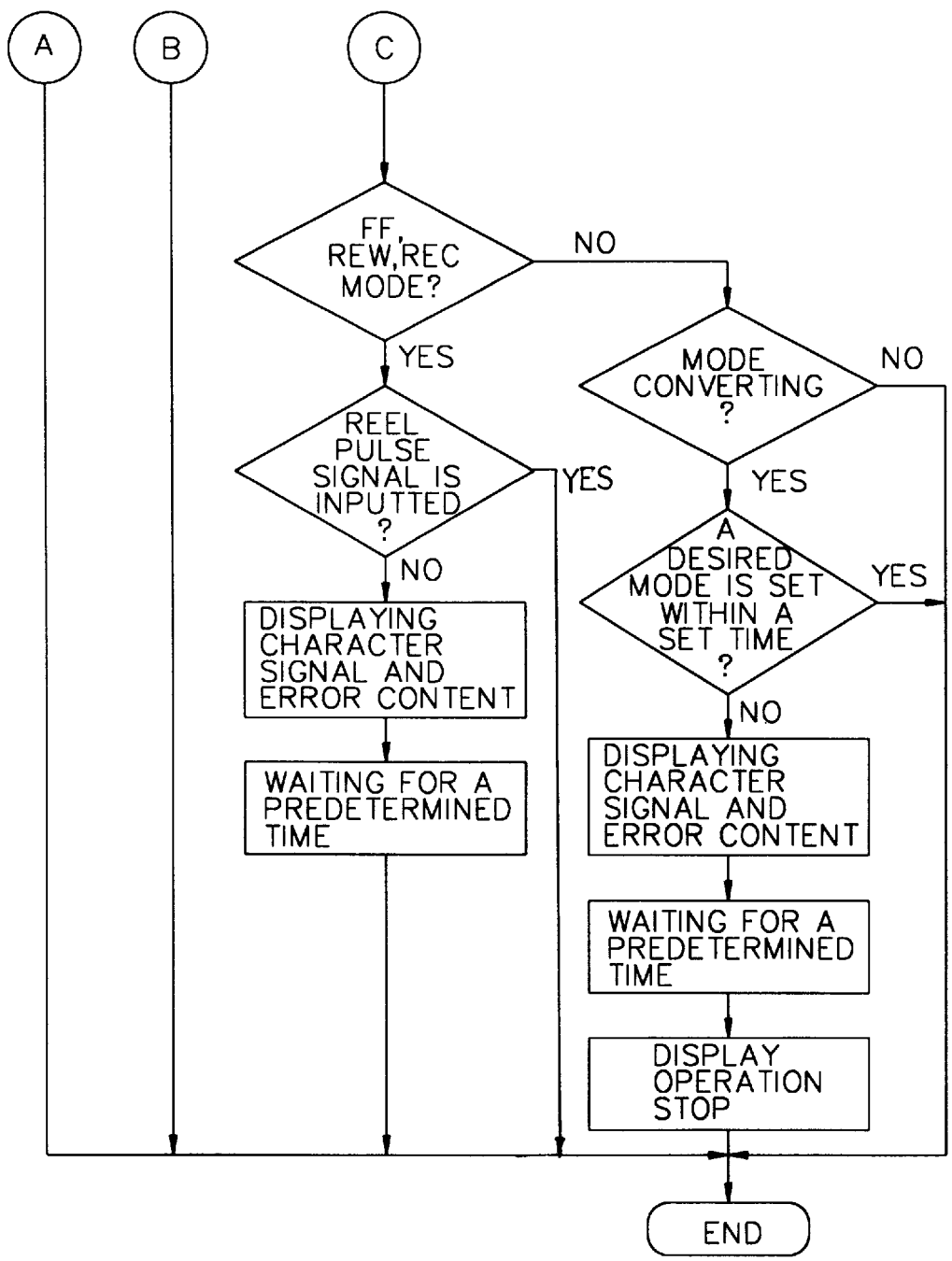
FIGS. 2A and 2B are flow charts illustrating a conventional self-diagnosing content display method for a VCR.
Figure 2A:
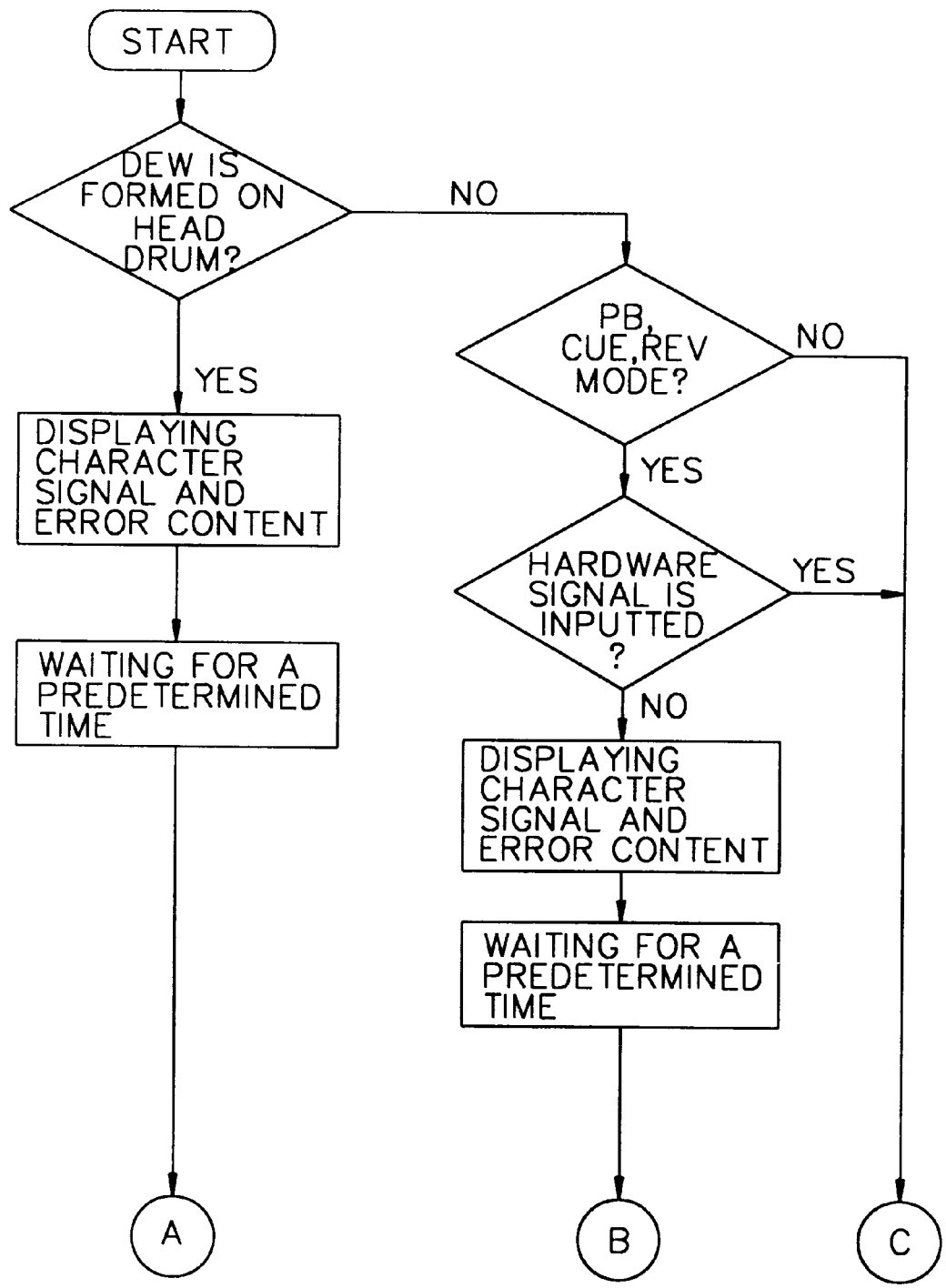
Figure 2B:
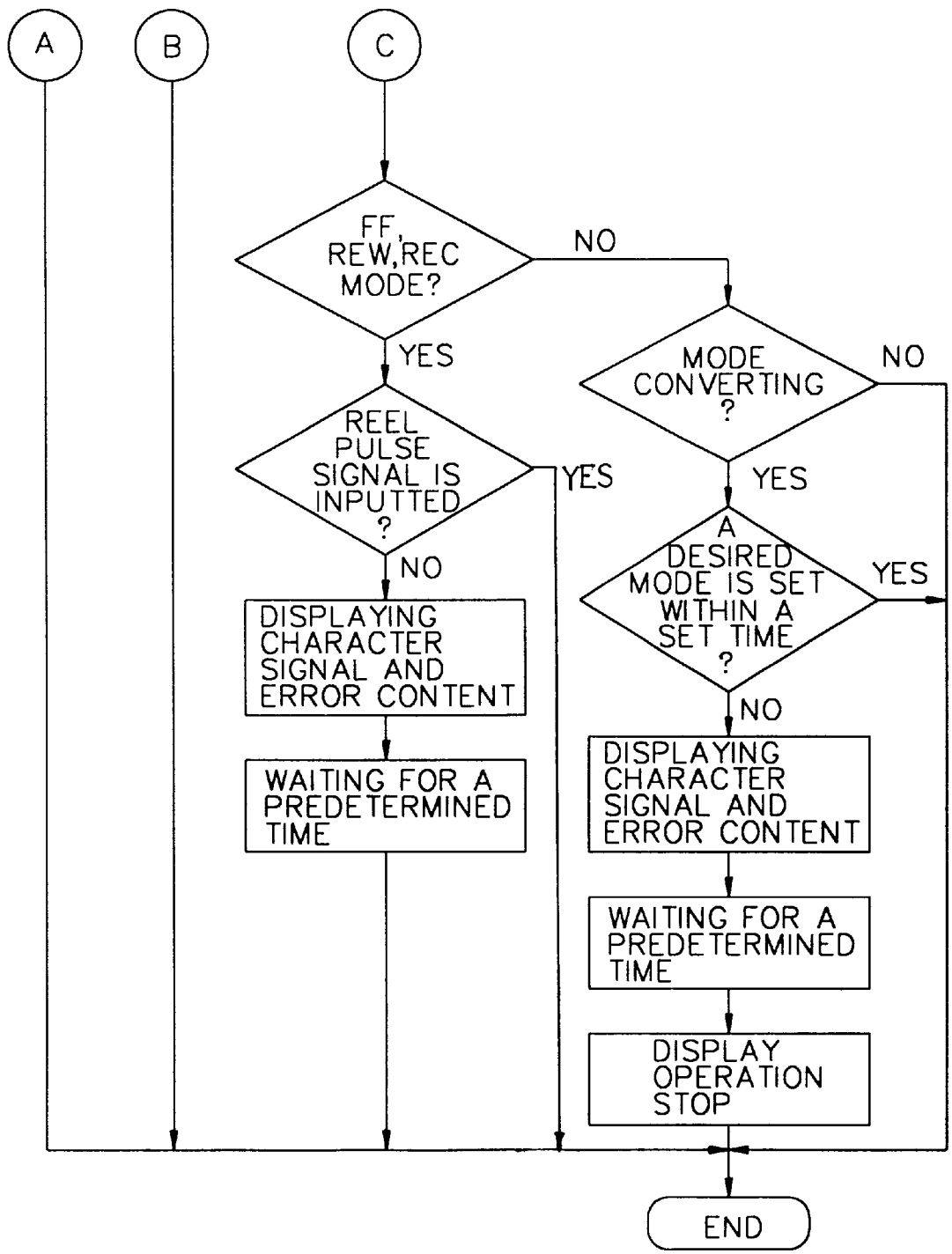
Figure 3:
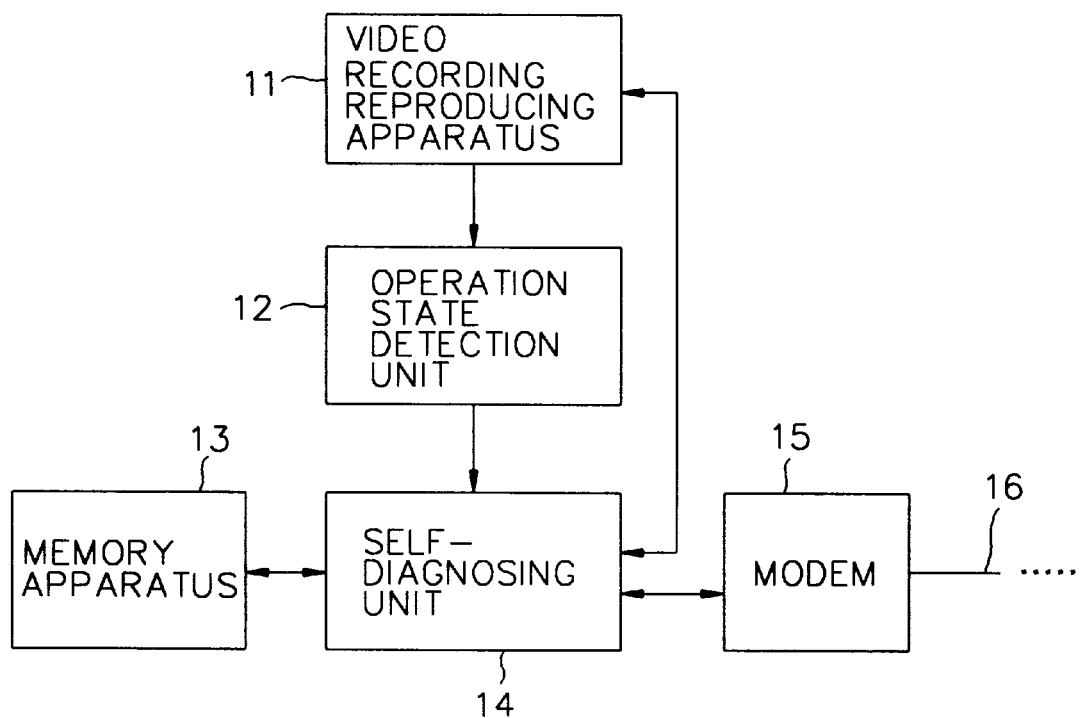
FIG. 3 is a block diagram illustrating a self-diagnosing apparatus for a video recording and reproducing apparatus according to the present invention.

FIG. 3 illustrates a self-diagnosing apparatus for a video recording and reproducing apparatus according to the present invention.

The self-diagnosing apparatus for a video recording and reproducing apparatus according to the present invention includes an operation state detection unit 12 for detecting an operation state of the apparatus in accordance with an operation state detection signal and a pre-stored use data of parts of the video recording and reproducing apparatus 11, a memory apparatus 13 for storing various information used for an error correction, a self-diagnosing unit 14 for classifying errors based on the output signal from the operation state detection unit 12, displaying or externally transmitting the various information used for detecting the errors and correcting the errors, and checking whether a telephone is being used, and a modem 15 for transmitting the various information from the self-diagnosing unit 14 to a receiver of a service center through a public telephone network 16.

The operation of the self-diagnosing apparatus for a video recording and reproducing apparatus will now be explained when a direct satellite receiver is used as the video recording and reproducing apparatus.

The direct satellite receiver 100 includes a satellite antenna 101 for receiving a signal down-linked from a satellite, an LNB 102 for down-converting the output from the satellite antenna 101, a tuner 103 for selecting a channel and converting an input high frequency of the selected channel into an intermediate frequency, a QPSK demodulation unit 104 for demodulating the intermediate frequency signal from the tuner 103 into color difference signals I and Q, an FEC (Forward Error Correction) decoder 105 for receiving the demodulated color difference signals I and Q and outputting an MPEG II transport stream data and a clock signal, a carrier wave/clock signal recovering unit 106 for recovering the carrier wave and clock signal from the signal received, a disscrambling unit 109 for disscrambling by using a code word, a demultiplexor 108 for demultiplexing a program special information (PSI), a video decoder 110 for decoding a video signal in accordance with the output signal from the demultiplexor 108, a mixer 111 and an NTSC encoder 112 for receiving the output signal from the video decoder 110 and outputting an analog video signal Vo, an audio decoder 113 for receiving the output signal from the demultiplexor 108 and decoding an audio signal, a D/A converter 114 for converting the digital signal from the audio decoder 113 into an analog audio signal Ao, and a controller 107 for controlling the operation of the elements of the apparatus.

In the drawings, a smart card 118, an infrared ray receiver 117, and an external interface unit 116 are external input apparatuses for inputting external input signals into the controller 107.

Figure 4:
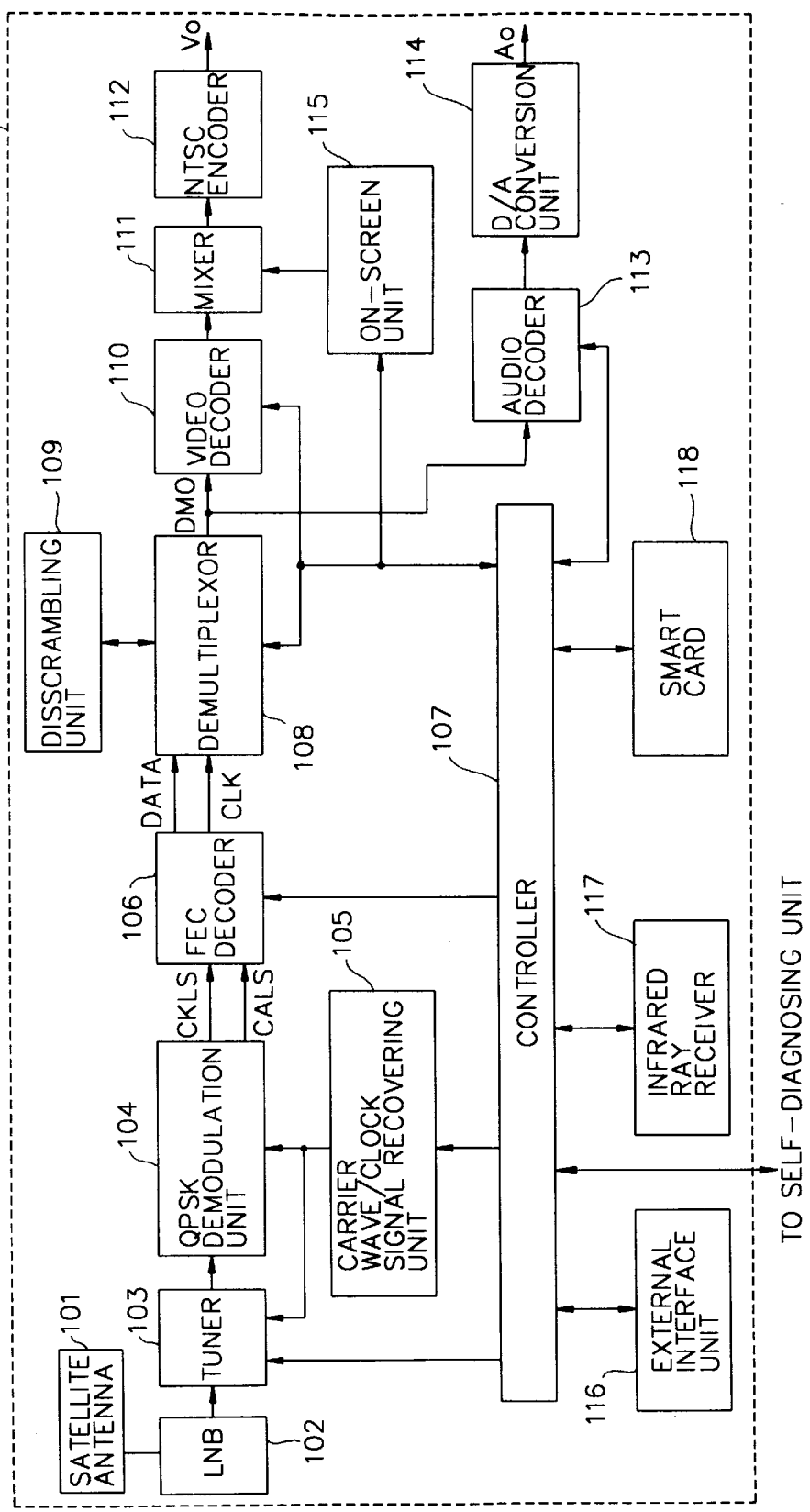
FIG. 4 is a block diagram illustrating a direct satellite receiver for a video recording and reproducing apparatus in the apparatus of FIG. 3 according to an embodiment of the present invention.
Figure 5:
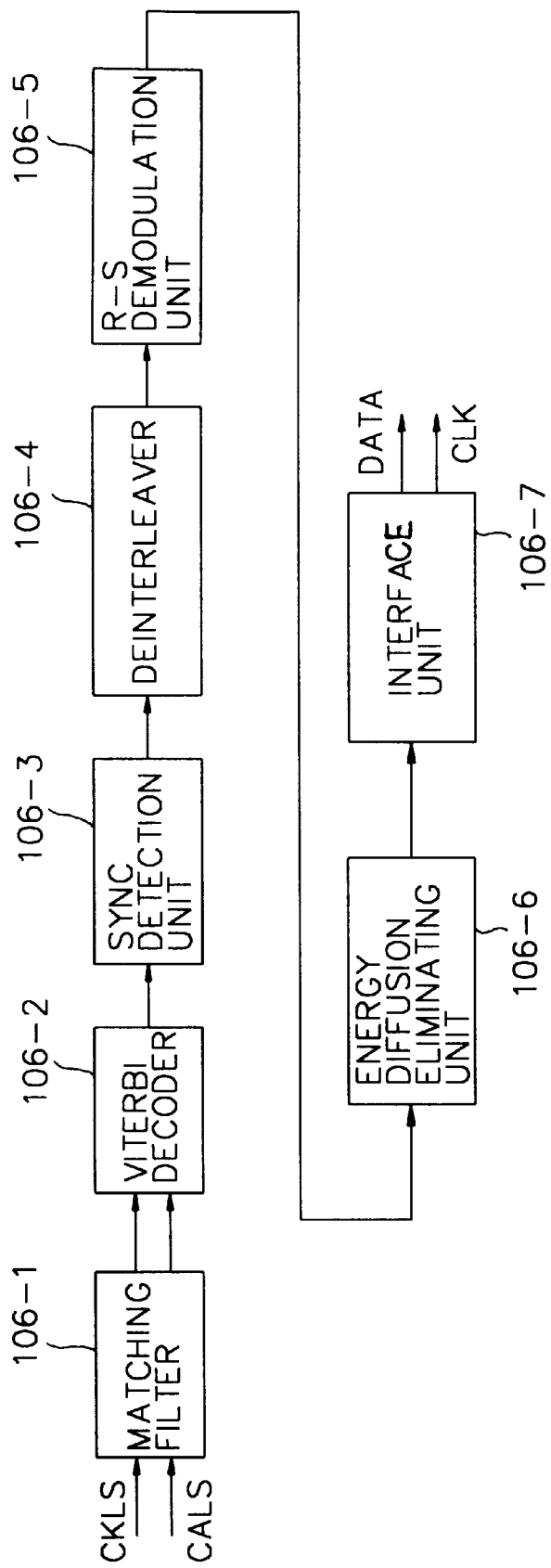
FIG. 5 is a detailed block diagram illustrating an FEC (Forward Error Correction) decoder in the apparatus of FIG. 4.
Figure 6:
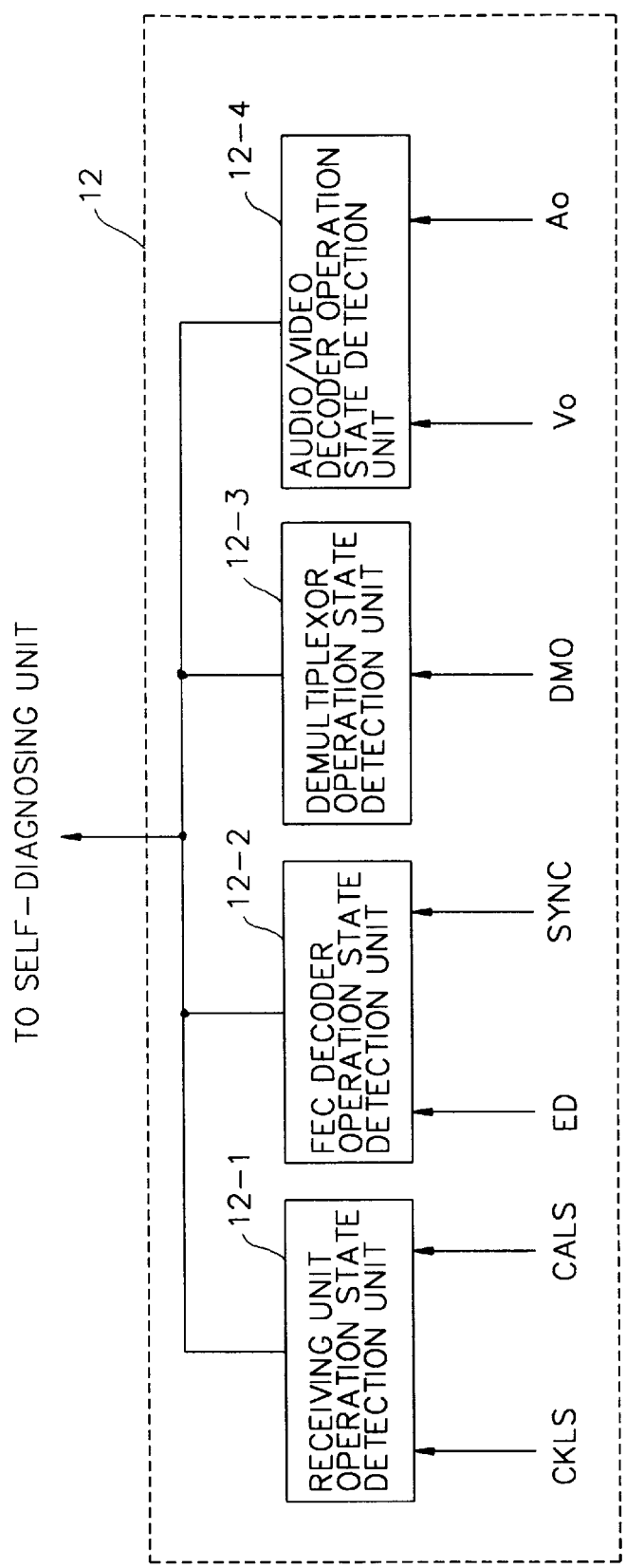
FIG. 6 is a detailed block diagram illustrating an operation state detection unit in the apparatus of FIG. 3 according to the present invention.

As shown in FIG. 4, the FEC decoder 106 includes a matching filter 106-1 for receiving the output from the QPSK demodulation unit 104, a Viterbi decoder 106-2 for receiving the output from the matching filter 106-1, a synchronous detection unit 106-3 for receiving the output from the Viterbi decoder 106-2, the deinterleaver 106-4 for receiving the output from the synchronous detection unit 106-3, a read-solomon (R-S) decoder 106-5 for receiving the output from the deinterleaver 106-4, an energy diffusion eliminating unit 106-6 for receiving the output from the read-solomon (R-S) decoder 106-5, and an interface unit 106-7 for receiving the output from the energy diffusion eliminating unit 106-6 and for transmitting the original data and clock signal to the demultiplexor 108.

The operation of the direct satellite receiver will now be explained with reference to the accompanying drawing.

The signals of 12 GHz down-linked from a satellite are received through the satellite antenna 101, down-converted into the signals of 1–2 GHz by the LNB 102, and transmitted to the tuner 103. At this time, in the controller 107, a corresponding channel is selected by using the tuner 103 and the PLL, so that the receiver selects a predetermined delay unit, and then the input high frequency of the selected channel is converted into the intermediate frequency.

The carrier wave/clock signal recovering unit 105 recovers the clock signal and carrier wave so that the carrier wave and clock signal received are recovered, and then the recovered signals are transmitted to the tuner 103 and the QPSK demodulation unit 104, respectively.

The QPSK demodulation unit 104 demodulates the intermediate frequency signals from the tuner 103 into color difference signals I and Q.

In addition, the operation that the FEC decoder 106 receives the demodulated color difference signals I and Q and outputs the data DATA and clock signal CLK of the MPEG II transport stream will now be explained with reference to FIG. 4.

First, the matching filter 106-1 performs a raised-cosine type pulse shaping filtering function with respect to the color difference signals I and Q. The thusly processed signals are decoded by the Viterbi decoder 106-2 and then supplied to the synchronous detection unit 106-3.

The synchronous detection unit 106-3 detects a synchronous byte data from the input signal, and the deinterleaver 106-4 deinterleaves the output signal from the synchronous detection unit 106-3 for changing a burst error into a random error. The errors in the thusly processed signals are corrected by the read-solomon (R-S) decoder 106-5.

In addition, the output signal from the read-solomon (R-S) decoder 106-5 is supplied to a base bandwidth of the interface unit 106-7 through the energy diffusion eliminating unit 106-6, and then the data and clock signal of the MPEG II transport stream are outputted.

The demultiplexor 108 demultiplexes the program specific information (PSI). This PSI includes a program association table (PAT), a program map table (PMT), and a conditional access table (CAT). The PAT provides a proportional integral and differential (PID) value of the PMT which has a program definition with respect to the service streams of all relay units. The PAT further provides the PID value of the transport packet for transmitting a program guide message (PMM) and a receiver command message (RCM) of a data stream of a resource management system (RSMS).

The PMT defines the program by matching the program with the integrity of the elementary stream. Namely, the video and audio data are separated, and the separated data are inputted into the video decoder 110 and the audio decoder 113, respectively. In addition, the CAT is used for a commercial broadcasting system. When a user inputs a data into the smart card 118, since the data with respect to the selected program is scrambled, in the controller 107, the scrambled codes are disscrambled by the disscrambling unit 109 by using the code word from the smart card 118 and then the disscrambled codes are inputted into the decoder 110 and the audio decoder 113, respectively.

The video decoder 110 recovers the MPEP II-compressed data to the digital data by using the controller 107, and the data is mixed with the signal from the on-screen unit 115 through the mixer 111 and then is outputted through the NTSC encoder 112 as an analog video signal VO.

In addition, the audio decoder 113 decodes the audio signal from the demultiplexor 108 and outputs an analog audio signal AO through the D/A converter 114.

The controller 107 receives a key data from a remote controller through the infrared ray receiving unit 117, drives the on-screen unit 115 by using the PMM information demultiplexed by the demultiplexor 108 in order to display the channel, etc., and displays a corresponding on-screen information on the screen through the mixer 111 and the NTSC encoder 112.

The operation state detection unit 12 of the self-diagnosing apparatus of the direct satellite receiver includes a receiving terminal operation state detection unit 12-1 for checking whether an error is outputted from the satellite antenna 101, the LNB 102, the tuner 103, the QPSK demodulation unit 104, or the carrier wave/clock signal recovering unit 105, an FEC decoder operation state detection unit 12-2 for detecting an external noise such as a sun noise, etc. and an error from the FEC decoder 106, a demultiplexor operation state detection unit 12-3 for detecting an operation state of the demultiplexor 108, and a video decoder 110, and an audio/video decoder operation state detection unit 12-4 for detecting an operation state of the audio decoder 113.

The self-diagnosing method using the self-diagnosing apparatus of a direct satellite receiver having the operation state detection unit 12 will now be explained with reference to the accompanying drawings.

Figure 7:
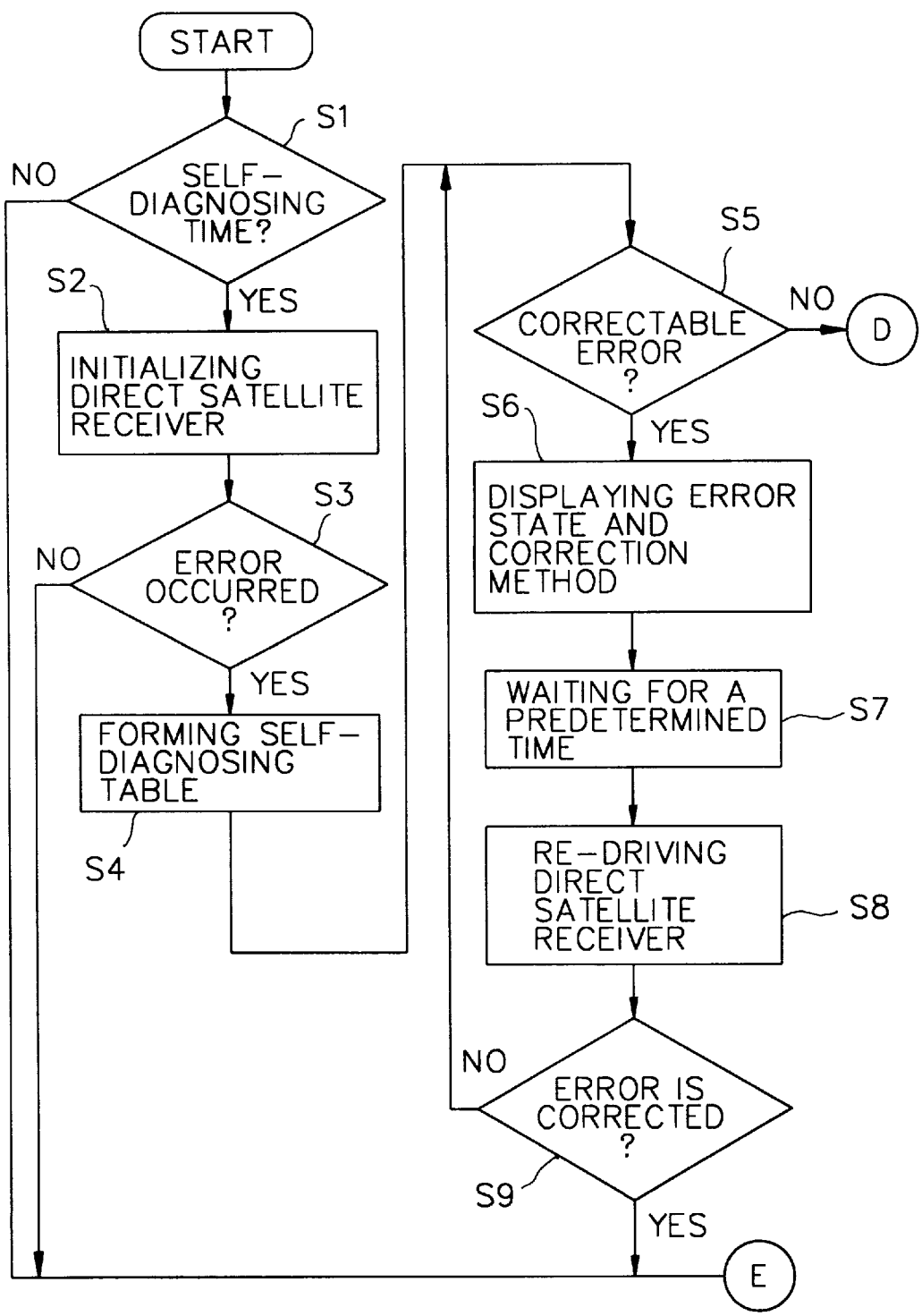
FIGS. 7A and 7B are flow charts illustrating a self-diagnosing method when a direct satellite receiver is used as a video recording and reproducing apparatus in the apparatus of FIG. 3.
Figure 7A:
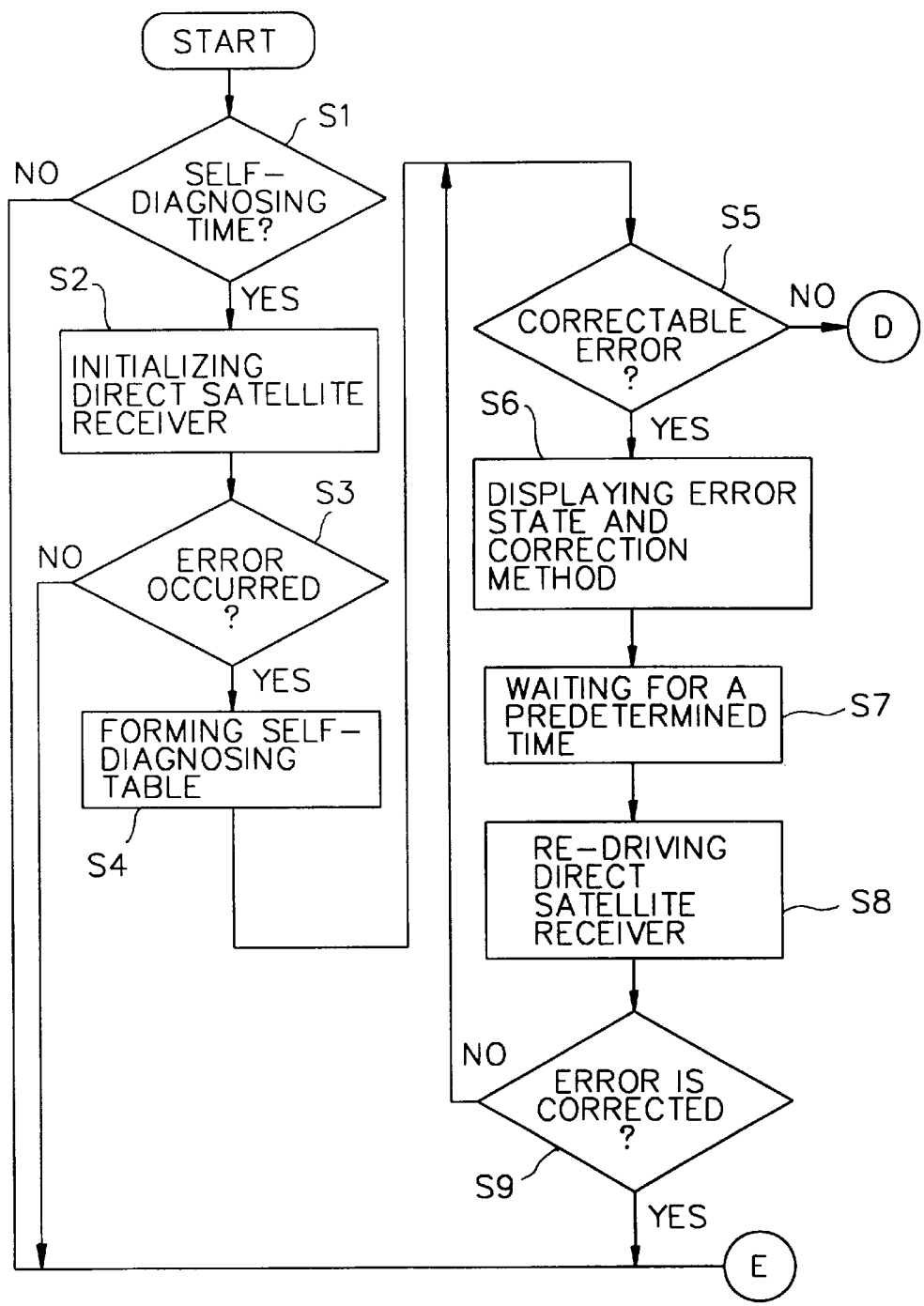

The self-diagnosing method for a direct satellite receiver is performed in the sequence shown in FIGS. 7A and 7B.

First, in diagnosing steps S1 trough S4, the self-diagnosing operation is performed at a predetermined period in Step S1, and then the parts of the apparatus are initialized in Step S2.

Figure 8:
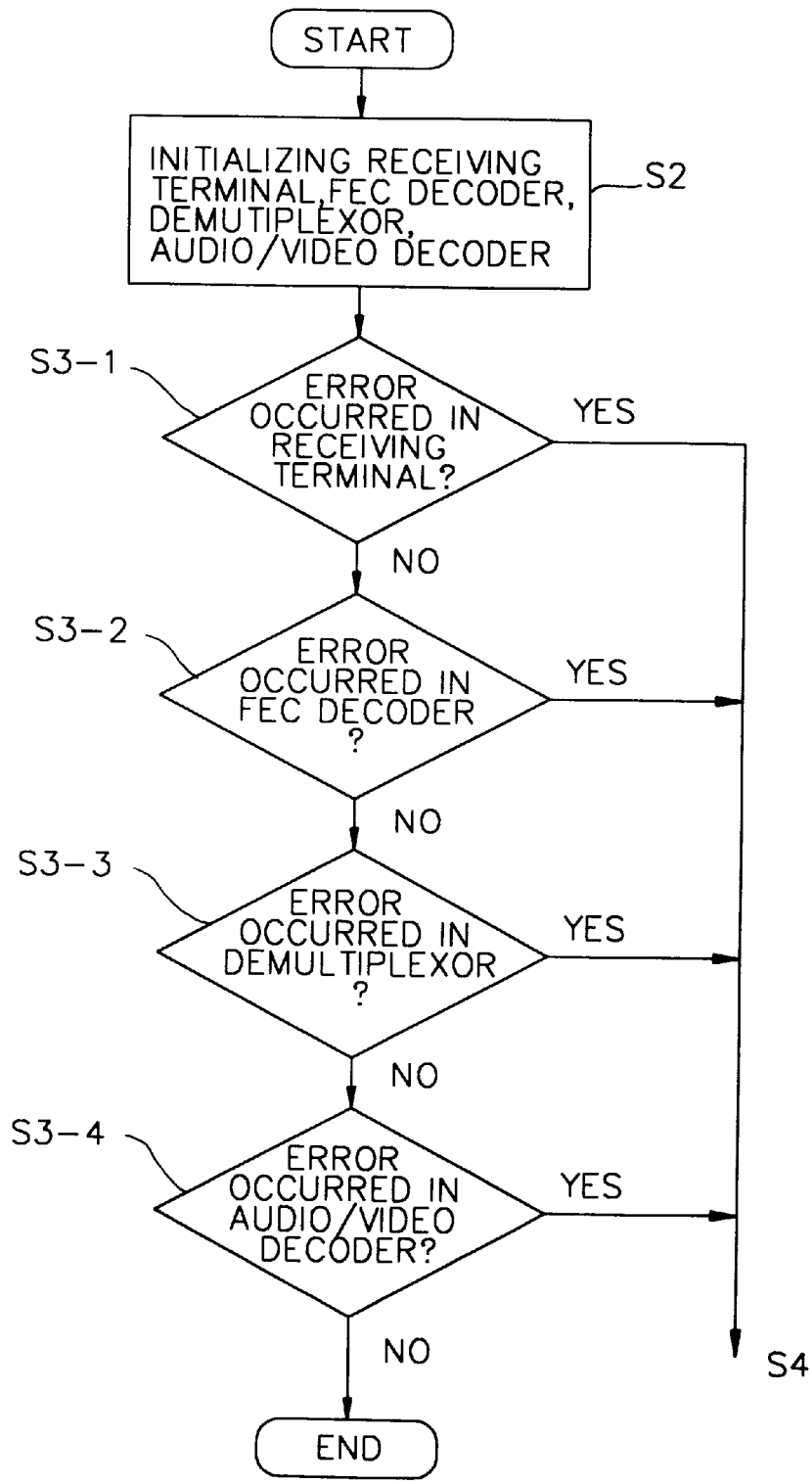
FIG. 8 is a flow chart illustrating a self-diagnosing method in the apparatus of FIGS. 7A and 7B.

As shown in FIG. 8, the operation of diagnosing each part of the apparatus one by one in Step S3.

When the satellite antenna 101 is normally installed in the normal installation direction, the clock signal and carrier wave are locked. If the antenna is abnormally installed, namely, if an error occurs in the LNB 102, the tuner 103, or the QPSK demodulation unit 104, the clock signal and carrier wave are not locked.

In order to detect the above-described abnormal operation state, the clock locking signal CKLS and the carrier wave locking signal CALS are inputted into the receiving terminal operation state detection unit 12-1, or the software-used detecting operation is performed with respect thereto. Therefore, the detected result is inputted into the receiving terminal operation state detection unit 12-1. Therefore, the receiving terminal operation state detection unit 12-1 judges the locking operation state based on the input signal, and a result of the judgement is outputted to the self-diagnosing unit 14 in Step S3-1.

However, when the clock signal and carrier wave are normally recovered, the thusly recovered signals are inputted into the FEC decoder 106, and the Viterbi interleaving operation and the read-solomon (R-S) decoding operation for correcting the error are performed, and then the signals are inputted into the demultiplexor 108.

Here, if an error occurs in the FEC decoder 106, or if errors, the amount of which exceeds a predetermined level, occurs due to a sun noise, an atmosphere noise, a rain falling noise, etc., the apparatus is not normally operated. The entire period (a short period) of the error output EO and synchronous signal Sync is made longer, so that the receiver is not normally operated. Therefore, the FEC decoder normal operation detection unit 123 performs a BER (Bit Error Rate) checking operation with respect to the error output EO and synchronous signal Sync, or the BER checking operation is performing by using a software. As a result, if an error exceeding a predetermined amount is detected, a result of the detection is transmitted to the self-diagnosing unit 14 in Step S3-2.

The demultiplexor 108 receives a control of the controller 107 and disscrambles the scrambled codes by using the code words from the smart card 118 with respect to the output data DATA and clock signal CLK from the FEC decoder 106 in accordance with a control of the controller 107 and then outputs the disscrambled codes to the video decoder 110 and the audio decoder 113, respectively.

Here, the demultiplexor unit operation state detection unit 12-3 processes the output signal DMO from the demultiplexor 108 by using a hardware for thus judging the operation state thereof, or checks the operation states on the routine of the demultiplexor 108 by using a software for thus transmitting a result of the check to the self-diagnosing unit 14 in Step S3-3.

In addition, the audio/video decoder operation state detection unit 12-4 processes the output signals from the video decoder 110 and the audio decoder 113 by using a hardware for thus judging the operation state thereof, or checks the operation state in the routine of the audio/video decoder operation state detection unit 12-4 by using a software for thus transmitting a result of the check to the self-diagnosing unit 14.

The self-diagnosing unit 14 checks step-by-step the operation state of parts of the apparatus based on the output signal from the detection unit 12-1 and 12-4 and the pre-stored use record information as shown in FIG. 8. If there is an error, the self-diagnosing table is formed as shown in FIG. 9, or the error is displayed on the monitor of the computer through the external interface unit 116 in Step S4.

Thereafter, in Step S5, the error is classified into an error which may be corrected, or an error which may not be corrected by a user.

In Step S5, if the error is classified as an error which may be corrected, the display steps S6 through S9 are processed.

In the display steps S6 through S9, the error state and correction method are displayed in Step S6. Thereafter, the parts of the apparatus are driven after a predetermined time in Step S7, and then it is judged in Step S9 whether the error was corrected. As a result, if the error is judged to be corrected, the routine is stopped. As a result, if the error was not corrected, the classification step S5 is processed.

However, if the error is classified as an error which the user can not correct in Step S5, the transmission steps S10 through S14 are performed.

In the transmission steps S10 through S14, a current error state and guide character are displayed in Step S10, and it is checked whether a user is currently using the telephone in Step S11. As a result, if the telephone is being used, the above-described step is processed again after a predetermined time in Step S12. As a result, if the telephone is not being used, the data such as the telephone number of a service center, the product serial number of an erroneous part (for example, model number, serial number, etc.), the erroneous part name, the use time of the erroneous part, the original life span of the erroneous part, and the address and telephone number of the user are read. Thereafter, the receiving terminal (for example, the personal computer, the terminal, and a bidirectional television set, etc.) of an external service center is connected in Step S13, and the read contents are transmitted to a corresponding receiving terminal in Step S14. Therefore, in the service center, the error is corrected based on the data transmitted thereto.

As the methods for checking the use time of the erroneous parts, there are a method of counting the operation mode (for example, counting the operation time in the play mode), and accumulatively summing the count time during the use time of the part for managing the erroneous parts which are operated at the time when the counting time is counted, and there is another method of counting the number of mode settings with respect to the parts which are operated at the time when the corresponding mode is set for thus managing the number of uses of the parts.

In addition, the data such as the serial number of the direct satellite receiver, the original life span of the erroneous part, etc. are stored into the memory apparatus 13 during the fabrication of the product, and the self-diagnosing unit 14 stores the number of the service center, the address and telephone number of the user, etc. into the memory apparatus 13 in accordance with a key input inputted thereto.

As described above, the self-diagnosing apparatus and a method for a direct satellite receiver according to the present invention is directed to block-by-block diagnosing the error of parts of the apparatus. As a result, the error contents which occur when there is an error of the part of the apparatus, the apparatus is not normally operated because the signal receiving direction of the antenna is not correct, etc are displayed on the monitor in order for the user to check the error state and then are transmitted to the service center through the modem, so that a repair man in the service center can more easily check the error state of the apparatus.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A self-diagnosing apparatus for a video recording and reproducing apparatus, comprising:

an operation state detection unit for detecting an operation state of a part of the apparatus;

a self-diagnosing unit for checking an erroneous part based on an output signal from the operation state detection unit and checking a using state of a telephone for displaying an information which is used for correcting the error and externally transmitting the information;

a memory apparatus for storing an information therein used for an error correction; and a modem for externally transmitting an information from the self-diagnosing unit via a public telephone line.

2. A self-diagnosing method for a video recording and reproducing apparatus, comprising:

a diagnosing step for diagnosing an operation state of a part of the apparatus based on an operation state detection signal of a part of the apparatus and a pre-stored use record of the part;

a classification step for classifying the errors into an error which may be corrected by a user based on the result of the diagnosis in the diagnosing step and an error which must be transmitted to the outside;

a display step for displaying a diagnosis result detected in the diagnosing step and a pre-stored error correction method when the error is classified into an error which can be corrected; and a transmission step for transmitting an error to a receiver having a telephone number previously designated via a modem in accordance with a result of the diagnosis in the diagnosing step when the error is classified in the classification step as an error which must be transmitted to the outside.

3. The method of claim 2, wherein said diagnosing step includes a sub-step for performing a self-diagnosing operation at a pre-set period.

4. The method of claim 2, wherein said diagnosing step includes a sub-step for step-by-step checking operation states of parts of the apparatus.

5. The method of claim 2, wherein said diagnosing step includes a sub-step for forming a self-diagnosing table when an error is detected in the apparatus.

6. The method of claim 2, wherein said diagnosing step includes a sub-step for checking operation states of parts of the apparatus by using a software or/and a hardware.

7. The method of claim 2, wherein said display step includes a first sub-step for waiting for a predetermined time, and a second sub-step for re-driving the video recording and reproducing apparatus.

8. The method of claim 2, wherein said transmission step includes a sub-step for checking a using state of a telephone.

* * * * *

UNITED STATES PATENT AND TRADEMARK OFFICE
CERTIFICATE OF CORRECTION

PATENT NO.   : 6,108,484
DATED        : August 22, 2000
INVENTOR(S)  : Yong-Taik Lim et al.

It is certified that error appears in the above-identified patent and that said Letters Patent is hereby corrected as shown below:

Please insert section "[30] Foreign Application Priority Data" as follows:
-- [30] Foreign Application Priority Data May 31, 1996    [KR] Korea ................... 19177/1996
    June 29, 1996    [KR] Korea ................... 25996/1996 --.

Signed and Sealed this

Ninth Day of October, 2001

Attest:

NICHOLAS P. GODICI
Attesting Officer    Acting Director of the United States Patent and Trademark Office